US008540898B2

(12) United States Patent
Saito

(10) Patent No.: US 8,540,898 B2
(45) Date of Patent: Sep. 24, 2013

(54) CATALYST FOR REVERSE SHIFT REACTION AND METHOD FOR PRODUCING SYNTHESIS GAS USING THE SAME

(75) Inventor: Yoshinori Saito, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 0 days.

(21) Appl. No.: 13/472,644

(22) Filed: May 16, 2012

(65) Prior Publication Data
US 2012/0231948 A1   Sep. 13, 2012

Related U.S. Application Data

(63) Continuation of application No. PCT/JP2010/069571, filed on Nov. 4, 2010.

(30) Foreign Application Priority Data

Nov. 27, 2009  (JP) ................................ 2009-269547

(51) Int. Cl.
*B01J 23/02*  (2006.01)
*B01J 21/06*  (2006.01)
*C01B 31/18*  (2006.01)

(52) U.S. Cl.
USPC ......... 252/373; 502/350; 502/340; 423/418.2

(58) Field of Classification Search
USPC ............... 502/350, 340; 423/418.2; 252/373
See application file for complete search history.

(56) References Cited

U.S. PATENT DOCUMENTS

| 5,102,645 | A | | 4/1992 | Fisher et al. |
| 5,714,091 | A | * | 2/1998 | Mazanec et al. ............... 252/373 |
| 6,048,472 | A | * | 4/2000 | Nataraj et al. ................. 252/373 |
| 6,143,203 | A | * | 11/2000 | Zeng et al. ..................... 252/373 |
| 2004/0180786 | A1 | | 9/2004 | Zhao et al. |
| 2008/0312070 | A1 | * | 12/2008 | Talbot et al. .................... 502/80 |
| 2009/0269264 | A1 | | 10/2009 | Saito et al. |

FOREIGN PATENT DOCUMENTS

| EP | 2 441 517 A1 | 4/2012 |
| JP | 04-244035 A | 9/1992 |
| JP | H06-505692 A | 6/1994 |

(Continued)

OTHER PUBLICATIONS

International Search Report and Written Opinion (in PCT/JP2010/069571), mailed Feb. 22, 2011.

(Continued)

*Primary Examiner* — Stanley Silverman
*Assistant Examiner* — Diana J Liao
(74) *Attorney, Agent, or Firm* — Dickstein Shapiro LLP

(57) ABSTRACT

There are provided a catalyst for reverse shift reaction which has excellent durability at a high temperature, can suppress generation of a methanation reaction, and can efficiently generate a reverse shift reaction to produce a synthesis gas including carbon monoxide and unreacted hydrogen with a reduced methane content, and a method for producing a synthesis gas using the catalyst for reverse shift reaction. The composition of the catalyst for the reverse shift reaction includes a composite oxide containing at least one alkali earth metal selected from the group consisting of Ca, Sr and Ba and at least one transition metal selected from the group consisting of Ti and Zr. A raw material gas containing carbon dioxide and hydrogen is contacted with the catalyst for reverse shift reaction at a temperature of 700° C. or higher.

17 Claims, 1 Drawing Sheet

(56) References Cited

FOREIGN PATENT DOCUMENTS

| JP | 06-211502 A | 8/1994 |
| JP | 08-176034 A | 7/1996 |
| JP | 2008-208148 A | 9/2008 |
| JP | 2010-194534 A | 9/2010 |

OTHER PUBLICATIONS

Hayakawa, Takashi et al.; Sustainable Ni/$Ca_{1-x}Sr_xTiO_3$ catalyst prepared in situ for the partial oxidation of methane to synthesis gas ; Applied Catalysis A: General vol. 149 (1997) pp. 391-410.
Supplementary European Search Report for corresponding EP Appl No. 10 83 3041, mailed Apr. 11, 2013.

* cited by examiner

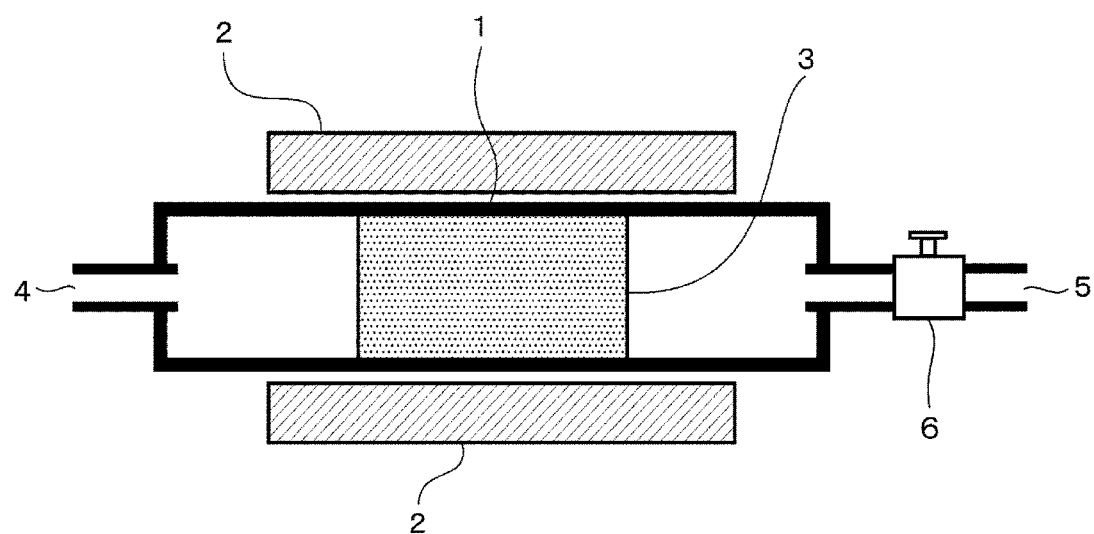

CATALYST FOR REVERSE SHIFT REACTION AND METHOD FOR PRODUCING SYNTHESIS GAS USING THE SAME

This is a continuation of application Serial No. PCT/JP2010/069571, filed Nov. 4, 2010, the entire contents of which are incorporated herein by reference.

TECHNICAL FIELD

The present invention relates to a catalyst for a reverse shift reaction, which is active for a reaction for generating carbon monoxide and water vapor from carbon dioxide and hydrogen, the reaction being a reaction reverse to the shift reaction for generating carbon dioxide and hydrogen from carbon monoxide and water vapor, and a method for producing a synthesis gas using the same.

BACKGROUND ART

In recent years, reduction of emissions of carbon dioxide and its effective utilization have been urgent issues because carbon dioxide is a main contributor to global warming. Hydrocarbon-based gases are generated from technical fields such as petroleum refining and petroleum chemistry, and a method for efficiently converting such gases into effective substances has been required.

Under this circumstance, there has been proposed a method in which a reverse shift reaction is carried out using hydrogen and carbon dioxide to produce a synthesis gas comprising generated carbon monoxide and unreacted hydrogen (see Patent Documents 1 and 2).

As shown in BACKGROUND ART (paragraph [0002]) of Patent Document 1, a method is known in which carbon dioxide in a gas after reforming water vapor is separated and fed back to a reformer.

Many catalysts have been put to use concerning catalysts for promoting a shift reaction represented by Formula (1) described below, i.e., catalysts for shift reaction, for the purpose of producing hydrogen.

$$CO+H_2O \rightarrow CO_2+H_2 \quad (1)$$

Many of the catalysts for promoting a shift reaction are considered to have an activity as a catalyst for the reverse shift reaction represented by Formula (2) described below.

$$CO_2+H_2 \rightarrow CO+H_2O \quad (2)$$

It is desirable that the reverse shift reaction be carried out at a high temperature of 600° C. or higher in consideration of the equilibrium composition of the synthesis gas generated by the reaction. However, since the temperature of 600° C. or higher is much higher than the temperature for carrying out a shift reaction in general, it is actually difficult to use these common catalysts for shift reaction.

A reverse shift reaction can proceed in a common water vapor reforming catalyst, but there is the problem that under pressurized conditions, a methanation which is described by Formula (3) below, occurs. This is a reaction reverse to the water vapor reforming reaction, and the methane generated reduces the concentration of carbon monoxide.

$$CO+3H_2 \rightarrow CH_4+H_2O \quad (3)$$

PRIOR ART DOCUMENTS

Patent Document 1: Japanese Patent Application Laid-Open No. 6-211502
Patent Document 2: Japanese Patent Application Laid-Open No. 4-244035

SUMMARY OF THE INVENTION

Problem to be Solved by the Invention

The present invention has been made in view of the situation described above, and an object thereof is to provide a catalyst for a reverse shift reaction which can be used at a high temperature, suppresses generation of a methanation reaction to efficiently generate a reverse shift reaction, thus making it possible to obtain a synthesis gas comprising carbon monoxide and hydrogen with the reduced methane content, and a method for producing a synthesis gas using the catalyst for reverse shift reaction.

Means for Solving the Problems

For solving the problem described above, a catalyst according to the present invention for a reverse shift reaction used for generating carbon monoxide and water vapor from carbon dioxide and hydrogen, is a composite oxide containing at least one alkali earth metal selected from the group consisting of Ca, Sr and Ba and at least one transition metal selected from the group consisting of Ti and Zr.

A method for producing a synthesis gas according to the present invention comprises contacting a raw material gas containing carbon dioxide and hydrogen with the catalyst for reverse shift reaction under a temperature condition of 700° C. or higher to carry out the reverse shift reaction.

Advantages of the Invention

The catalyst for reverse shift reaction according to the present invention comprises a composite oxide containing at least one alkali earth metal selected from the group consisting of Ca, Sr, and Ba, and at least a component selected from the group consisting of Ti and Zr. A perovskite compound containing an alkali earth metal, like the catalyst for reverse shift reaction according to the present invention, acts as a basic catalyst and therefore has high affinity with $CO_2$, and undergoes oxidation and reduction by oxygen in a lattice and therefore has a high catalytic activity in a reverse shift reaction using $CO_2$.

Consequently, a reverse shift reaction of hydrogen and carbon dioxide can be efficiently promoted while suppressing a methanation reaction under a high-temperature condition by using the catalyst for reverse shift reaction, thus making it possible to efficiently produce a synthetic gas containing carbon monoxide and hydrogen.

As described previously, the shift reaction is a reaction for generating $H_2$ and $CO_2$ using $CO$ and $H_2O$ as a raw material as shown in the Formula (1)

$$CO+H_2O \rightarrow CO_2+H_2 \quad (1)$$

The relative amounts in the composition of $CO_2$, $H_2$, $CO$ and $H_2O$ is controlled by chemical equilibrium, and the hydrogen production process is carried out at a low temperature that facilitates the Formula (1) reaction.

In a high-temperature range, a reaction in a reverse direction, namely, a reverse shift reaction represented by Formula (2) occurs.

$$CO_2+H_2 \rightarrow CO+H_2O \quad (2)$$

Accordingly, if it is desired to obtain a synthesis gas with a high concentration of CO using $H_2$ and $CO_2$ as a raw material, the reverse shift reaction of Formula (2) may be allowed to proceed at a temperature higher than that of a normal shift reaction process.

In the Formula (2) reaction, CO and $H_2O$ are generated, but the composition amounts of $CO_2$, $H_2$, CO and $H_2O$ is controlled by chemical equilibrium, and therefore the composition of the resulting gas depends on the reaction temperature and the $CO_2/H_2$ ratio in the raw material gas. For obtaining a synthesis gas, unreacted $CO_2$ and generated $H_2O$ may be removed from a gas after reaction. The ratio of $H_2$ in the synthesis gas can be increased as the ratio of $H_2$ in the raw material gas increases.

The catalyst for reverse shift reaction according to the present invention has an activity as a catalyst that causes the Formula (2) reaction at a high temperature, such as a temperature higher than 700° C. (for example, 700° C. to 1100° C.). However, further details of methanation by which the reverse shift reaction system according to the present invention are not presently known.

As in the method for producing a synthesis gas according to the present invention, a raw material gas containing carbon dioxide and hydrogen is contacted with the catalyst for reverse shift reaction under a temperature condition of 700° C. or higher to carry out a reverse shift reaction, whereby a synthesis gas of high utility value can be efficiently produced.

BRIEF EXPLANATION OF DRAWING

FIG. 1 is a view showing a schematic configuration of a test apparatus used for carrying out a reverse shift reaction test in Example of the present invention.

MODE FOR CARRYING OUT THE INVENTION

The features of the present invention will be described below more in detail with reference to an example of the present invention.

Example 1

Production of Catalysts for Reverse Shift Reaction (1) Production of Catalyst for Reverse Shift Reaction A According to Example of the Present Invention $SrCO_3$ and $TiO_2$ were weighed so as to have a molar ratio of 1.0:1.0, mixed in a ball mill and then dried. Next, a binder was added to this mixture and the mixture was granulated into spherical bodies having a diameter of 2 to 5 mm. The resulting granular material was fired in air at 1100° C. for an hour to obtain a catalyst for reverse shift reaction A comprising a composite oxide ($SrTiO_3$).

(2) Production of Catalyst for Reverse Shift Reaction B According to Example of the Present Invention $SrCO_3$ and $ZrO_2$ were weighed so as to have a molar ratio of 1.0:1.0, mixed in a ball mill and then dried. Next, a binder was added to this mixture and the mixture was granulated into spherical bodies having a diameter of 2 to 5 mm. The resulting granular material was fired in air at 1100° C. for an hour to obtain a catalyst for reverse shift reaction B comprising a composite oxide ($SrZrO_3$).

(3) Production of Catalyst for Reverse Shift Reaction C According to Example of the Present Invention $BaCO_3$ and $ZrO_2$ were weighed so as to have a molar ratio of 1.0:1.0, mixed in a ball mill and then dried. Next, a binder was added to this mixture and the mixture was granulated into spherical bodies having a diameter of 2 to 5 mm. The resulting granular material was fired in air at 1100° C. for an hour to obtain a catalyst for reverse shift reaction C comprising a composite oxide ($BaZrO_3$).

(4) Production of Catalyst for Reverse Shift Reaction D According to Example of the Present Invention $CaCO_3$ and $ZrO_2$ were weighed so as to have a molar ratio of 1.0:1.0, mixed in a ball mill and then dried. Next, a binder was added to this mixture and the mixture was granulated into spherical bodies having a diameter of 2 to 5 mm. The resulting granular material was fired in air at 1100° C. for an hour to obtain a catalyst for reverse shift reaction D comprising a composite oxide ($CaZrO_3$).

(5) Production of Catalyst for Reverse Shift Reaction E According to Example of the Present Invention $SrCO_3$, $TiO_2$ and $ZrO_2$ were weighed so as to have a molar ratio of 1.0:0.25:0.75, mixed in a ball mill and then dried. Next, a binder was added to this mixture and the mixture was granulated into spherical bodies having a diameter of 2 to 5 mm. The resulting granular material was fired in air at 1100° C. for an hour to obtain a catalyst for reverse shift reaction E comprising a composite oxide (mixture of $SrTiO_3$ and $SrZrO_3$).

(4) Preparation of Catalysts for Comparison

The following three kinds of catalysts were prepared as catalysts for comparison:

(a) commercially available γ-alumina (catalyst F)

(b) water vapor reforming catalyst for methane having Ni as a main component ($Ni+Al_2O_3$) (catalyst G)

(c) MgO (catalyst H).

Reverse Shift Reaction Test and Evaluation of Properties

The catalysts for reverse shift reaction A to E (according to the present invention) and the catalysts F to H (Comparative Examples) were used to conduct a reverse shift reaction test for generating carbon monoxide and water vapor from a raw material gas containing carbon dioxide and hydrogen, and the properties of the catalysts were evaluated.

The reverse shift reaction test was conducted by the method described below using a test apparatus shown in FIG. 1. As shown, the test apparatus used herein comprises a reaction tube 1 having an exterior heater 2, a gas inlet 4 for supplying a gas to the reaction tube 1, a gas outlet 5 for discharging a gas from the reaction tube 1 and a pressure regulator 6 for regulating the pressure within the reaction tube.

2.5 cc of each of catalysts for reverse shift reaction (catalysts A to H) 3 as described above were filled in the reaction tube 1 and heated to 700° C. by the heater 2, and a mixed gas of hydrogen ($H_2$) and carbon dioxide ($CO_2$) ($H_2$:$CO_2$=63:37 (volume ratio)) was circulated from the gas inlet 4 of the reaction tube 1 at a rate of 9.4 NL/h (SV (space velocity)=3750 $h^{-1}$) to conduct a reverse shift reaction test.

During the test, water was removed from the gas discharged from the gas outlet 5 of the reaction tube 1, followed by introducing the gas into an analyzer to analyze the gas composition, and the gas composition associated with each catalyst used was examined.

During the test, $CO_2$ is consumed as the reverse shift reaction of Formula (2) proceeds, but CO generated with the methanation of Formula (3) reacts with $H_2$ to generate methane.

$$CO_2 + H_2 \rightarrow CO + H_2O \qquad (2)$$

$$CO + 3H_2 \rightarrow CH_4 + H_2O \qquad (3)$$

Table 1 shows the specific surface areas of the catalysts A to H, gas compositions after reaction in reverse shift reaction tests conducted using the catalysts A to H, and equilibrium compositions (calculated values) under test conditions determined by equilibrium calculation.

TABLE 1

| Catalyst | Specific surface area ($m^2/g$) | Composition of generated gases (%) | | | | $CO_2$ conversion |
|---|---|---|---|---|---|---|
| | | $H_2$ | $CO_2$ | CO | $CH_4$ | |
| A (Example) | 4.8 | 55.0 | 22.0 | 23.0 | ND | 0.51 |
| B (Example) | 8.8 | 54.2 | 20.3 | 25.5 | ND | 0.56 |
| C (Example) | 10.7 | 54.8 | 20.7 | 24.5 | ND | 0.54 |
| D (Example) | 3.9 | 55.1 | 21.4 | 23.5 | ND | 0.52 |
| E (Example) | 9.2 | 54.1 | 20.1 | 25.8 | ND | 0.56 |
| F (Comparative Example) | 250 | 57.6 | 27.7 | 14.7 | ND | 0.35 |
| G (Comparative Example) | 160 | 53.3 | 21.0 | 25.0 | 0.7 | 0.55 |
| H (Comparative Example) | 20.7 | 56.2 | 23.4 | 20.4 | ND | 0.46 |
| Equilibrium composition | — | 52.4 | 21.2 | 25.6 | 0.7 | 0.55 |

The specific surface areas of the catalysts A to H in Table 1 are values measured by the BET method. The $CO_2$ conversion represents a rate at which $CO_2$ as a raw material is converted into CO or $CH_4$, and is a value calculated in accordance with Formula (4):

conversion=(CO concentration+$CH_4$ concentration)/
(CO concentration+$CH_4$ concentration+$CO_2$ concentration) (4)

As shown in Table 1, it was found that the catalysts for reverse shift reaction A to D (perovskite compounds containing an alkali earth metal), which meets the requirements of the present invention, show a high $CO_2$ conversion.

It was found that the catalyst E, a mixed system of the catalyst for reverse shift reaction A and the catalyst for reverse shift reaction B, also showed a high $CO_2$ conversion and had a high catalytic activity similarly to the catalysts for reverse shift reaction A to D.

It was found that the catalytic activity has a correlation to the specific surface area, and the catalysts for reverse shift reaction C and E having a large specific surface area have an especially high catalytic activity.

On the other hand, it was found that γ-alumina (catalyst F for comparison) has a low catalytic activity despite the fact that it has a specific surface area greater than the catalysts for reverse shift reaction A to E by a factor of 10 or more.

It was found that the catalyst G, a commercially available methane reforming catalyst, has activity as a catalyst for reverse shift reaction and a high $CO_2$ conversion, but causes methanation in a side reaction. It was found that the amount of methane generated represents a concentration equivalent to the equilibrium composition, and the catalyst G cannot be used under pressurized conditions where methanation more likely to occur.

It was found that the catalyst H for comparison (a catalyst using MgO, a basic catalyst) also has an activity higher than that of comparison catalyst F as a catalyst for reverse shift reaction, and causes no methanation. However, it was found that the catalyst H has a catalytic activity which is considerably low compared to the catalysts A to E which meet the requirements of the present invention, and is not preferable as a catalyst for reverse shift reaction.

From the above results, it was found that the catalysts which meet the requirements of the present invention (perovskite compounds with an alkali earth metal) have such excellent properties that they have a high activity as a catalyst for reverse shift reaction and do not produce methanation in a side reaction.

It is known that generally the conversion increases as the synthesis pressure becomes higher in liquid fuel chemical synthesis and the like using a synthesis gas as a raw material. Thus, employment of a pressurization process is desired also in a process of producing a synthesis gas (reverse shift reaction process) in a front stage of the chemical synthesis process, and the desire can be met according to the present invention. That is, while methanation is likely to occur in the a reverse shift reaction under pressure, when using the catalyst for reverse shift reaction according to the present invention, the pressurization process can be employed without the possibility of causing methanation.

Therefore, it can be said that the catalyst according to the present invention and the method for producing a synthesis gas according to the present invention, which can suppress generation of methane ($CH_4$) even under high-temperature and pressurized conditions to efficiently produce a synthesis gas having the reduced methane content and containing carbon monoxide and hydrogen at a high ratio, are very useful.

The present invention is not limited to the Example described above, but various applications and modifications may be made within the scope of the invention concerning the method for producing a catalyst for reverse shift reaction and specific conditions for the reverse shift reaction when using the catalyst for reverse shift reaction according to the present invention.

DESCRIPTION OF REFERENCE SYMBOLS 1 reaction tube
2 heater
3 catalyst for reverse shift reaction
4 gas inlet of reaction tube
5 gas outlet of reaction tube
6 pressure regulator

The invention claimed is:
1. A method for producing a synthesis gas, comprising contacting a raw material gas comprising carbon dioxide and hydrogen with a catalyst for reverse shift reaction which comprises a composite oxide containing at least one alkali earth metal selected from the group consisting of Ca, Sr, and Ba, and at least one transition metal selected from the group consisting of Ti and Zr at a temperature of 700° C. or higher.
2. The method for producing a synthesis gas according to claim 1 in which the raw material gas has a hydrogen to carbon dioxide volume ratio greater than 1:1.
3. The method for producing a synthesis gas according to claim 2 further comprising separating at least one of $CO_2$ and $H_2O$ from the synthesis gas resulting from the reverse shift reaction.
4. The method for producing a synthesis gas according to claim 1, further comprising separating at least one of $CO_2$ and $H_2O$ from the synthesis gas resulting from the reverse shift reaction.
5. The method for producing a synthesis gas according to claim 1, wherein the composite oxide is a perovskite.
6. The method for producing a synthesis gas according to claim 1, wherein the alkali earth metal comprises Ca.

7. The method for producing a synthesis gas according to claim 1, wherein the alkali earth metal comprises Sr.

8. The method for producing a synthesis gas according to claim 1, wherein the alkali earth metal comprises Ba.

9. The method for producing a synthesis gas according to claim 1, wherein the transition metal comprises Ti.

10. The method for producing a synthesis gas according to claim 1, wherein the transition metal comprises Zr.

11. The method for producing a synthesis gas according to claim 1, wherein the catalyst is $SrTiO_3$.

12. The method for producing a synthesis gas according to claim 1, wherein the catalyst is $SrZrO_3$.

13. The method for producing a synthesis gas according to claim 1, wherein the catalyst is $BaZrO_3$.

14. The method for producing a synthesis gas according to claim 1, wherein the catalyst is $CaZrO_3$.

15. The method for producing a synthesis gas according to claim 1, wherein the composite oxide is a mixture of two different perovskites.

16. The method for producing a synthesis gas according to claim 15, wherein the perovskites are $SrTiO_3$ and $SrZrO_3$.

17. The method for producing a synthesis gas according to claim 1 in which the temperature is 700° C. to 1100° C.

\* \* \* \* \*